United States Patent
Karlsson et al.

(10) Patent No.: US 11,074,624 B1
(45) Date of Patent: Jul. 27, 2021

(54) ADAPTIVE COST ESTIMATION

(71) Applicant: OATH (AMERICAS) INC., New York, NY (US)

(72) Inventors: Niklas Karlsson, Mountain View, CA (US); Jiaxing Guo, Sunnyvale, CA (US); Yih-Shin Huang, Cupertino, CA (US)

(73) Assignee: Verizon Media Inc., New York, NY (US)

( * ) Notice: Subject to any disclaimer, the term of this patent is extended or adjusted under 35 U.S.C. 154(b) by 1033 days.

(21) Appl. No.: 15/005,793

(22) Filed: Jan. 25, 2016

(51) Int. Cl.
  *G06Q 30/00* (2012.01)
  *G06Q 30/02* (2012.01)

(52) U.S. Cl.
  CPC ..... *G06Q 30/0273* (2013.01); *G06Q 30/0206* (2013.01)

(58) Field of Classification Search
  CPC . G06Q 30/02; G06Q 30/0273; G06Q 30/0206
  USPC ............................ 705/14.48, 14.46, 14.71
  See application file for complete search history.

(56) References Cited

U.S. PATENT DOCUMENTS

| | | | | |
|---|---|---|---|---|
| 2004/0088241 A1* | 5/2004 | Rebane | ......... | G06Q 30/08 705/37 |
| 2011/0035276 A1* | 2/2011 | Ghosh | ......... | G06Q 30/02 705/14.46 |

* cited by examiner

*Primary Examiner* — Sun M Li
(74) *Attorney, Agent, or Firm* — Cooper Legal Group, LLC

(57) ABSTRACT

Embodiments of the present invention provide systems, methods, and computer storage media directed at cost estimation. In embodiments, a method may include receiving an observed event volume and an observed revenue in the current logical interval for a campaign. The method may also include tracking state information of various revenue state variables and events per revenue state variables associated with the previous logical interval. In addition, the method may include determining a cost estimate for a present logical interval of the campaign based on the state information, the observed event volume, the observed revenue, and an events per revenue forgetting factor. Other embodiments may be described and/or claimed herein.

20 Claims, 7 Drawing Sheets

ADAPTIVE COST ESTIMATION

TECHNICAL FIELD

The present disclosure relates generally to computing. More specifically, and without limitation, the present disclosure relates to systems and methods for adaptive cost estimation.

BACKGROUND

Online marketers are interested in placing marketing messages on websites to promote their products or services (also known as "impressions"). Influenced by a marketing message, a user may perform a "click" based on a marketing message or take another "action" such as completing an online form to request additional information with regard to the associated product or service. If the user later purchases the product or service, the purchase is referred to as a "conversion" of the impression. In general, online marketers pay based on, for example, impressions, clicks, or conversions over the course of a marketing campaign, hereinafter merely referred to as a "campaign." Therefore, cost estimation of events during the campaign is important to properly manage the campaign, e.g., for budgeting purpose.

The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

DETAILED DESCRIPTION OF THE EMBODIMENTS

Reference will now be made in detail to illustrative embodiments of the invention, examples of which are illustrated in the accompanying drawings. Wherever possible, the same reference numbers will be used throughout the drawings to refer to the same or like parts.

Average cost per event estimation with a fixed estimator gain tend for objects with a low event rate to be responsive but volatile, and tend for objects with a high event rate to be non-volatile but sluggish.

At a high level, aspects of the embodiments disclosed herein relate an estimator gain to the temporal volatility of the average cost per event estimate, hereinafter merely referred to as cost estimate. Basically, a desired relative volatility may be translated to a specific estimator gain. Hence, the gain can be selected adaptively to ensure the relative volatility remains at, or about, a certain level, or remains no larger than at a certain level. The estimator gain may be updated adaptively based on an estimated revenue rate and an estimated events per revenue. An estimated events per revenue refers to a number of events that is expected for a certain unit of revenue (e.g., 100 clicks/$100). The adaptive cost estimation can also be complemented with a constraint on maximum or minimum responsiveness, e.g., by maintaining the estimator gain between a minimum and maximum value.

By adjusting the estimator gain based on the expected temporal variance of a cost estimate, robustness and response time of such cost estimation may be balanced. In particular, various embodiments disclosed herein can make volatile cost estimates less volatile (e.g., at the expense of response time) and non-volatile cost estimates more responsive. Additionally, such adaptive cost estimation can also make all cost estimates have the same relative volatility, e.g., making some of them more responsive and some less responsive.

Figure 1:
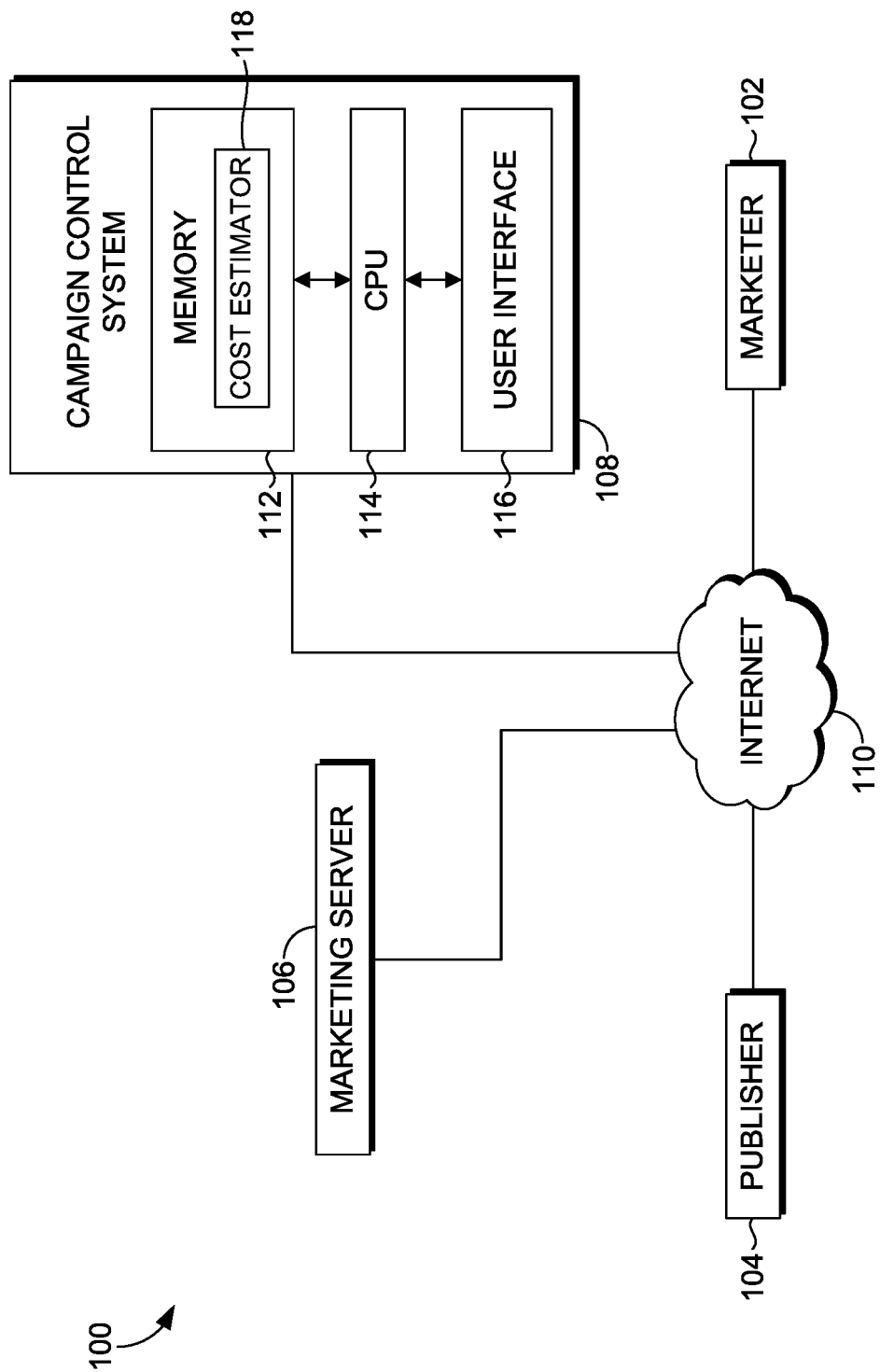
FIG. 1 depicts an illustrative marketing system, in accordance with embodiments of the present disclosure.

FIG. 1 depicts an illustrative marketing system 100, in accordance with embodiments of the present disclosure. As shown in FIG. 1, marketing system 100 may include one or more marketers 102, publishers 104, marketing servers 106, and campaign control systems 108, that are in communication with one another through a network, such as the Internet 110. The number and orientation of the computing components in FIG. 1 is provided for purposes of illustration only. Any other number and orientation of components is possible. For example, one or more of marketers 102, publishers 104, marketing servers 106, and campaign control systems 108 may be combined or co-located and/or communicate directly with one another, instead of over Internet 110. The components of FIG. 1 may include any type or configuration of computers and/or servers, such as, for example, a server cluster, a server farm, load balancing servers, distributed servers, etc. In addition, each component may include one or more processors, memories or other data storage devices (i.e., computer-readable storage media), such as hard drives, NOR or NAND flash memory devices, or Read Only Memory (ROM) devices, etc., communications devices, and/or other types of computing elements.

Marketer 102 represent computing components associated with entities having online advertisements (e.g., banner ads, pop-ups, etc.) that the entities desire to deliver to online consumers. Marketer 102 may interact with publishers 104, marketing servers 106, and/or campaign control systems 108 through the Internet 110. Thus, marketer 102 may be able to communicate marketing information, such as ad information, targeting information, consumer information, budget information, bidding information, etc., to other entities in system 100.

Publishers 104 represent computing components associated with entities having inventories of available online marketing space. For example, publishers 104 may include computing components associated with online content providers, search engines, e-mail programs, web-based applications, or any computing component or program having online user traffic. Publishers 104 may interact with marketers 102, marketing servers 106, and/or controllers 108 via the Internet 110. Thus, publishers 104 may be able to communicate inventory information, such as site information, demographic information, cost information, etc., to other computing components in system 100.

Marketing servers 106 may include servers or clusters of servers configured to process marketing information from marketer 102 and/or inventory information from publishers 104, either directly or indirectly. In certain embodiments, marketing servers 106 may be remote web servers that receive marketing information from marketer 102 and serve ads to be placed by publishers 104. Marketing servers 106 may be configured to serve ads across various domains of publishers 104, for example, based on marketing information provided by marketers 102. Marketing servers 106 may also be configured to serve ads based on contextual targeting of web sites, search results, and/or user profile information. In some embodiments, marketing servers 106 may be configured to serve ads based on control signals generated by campaign control systems 108.

Campaign control system 108 may include computing systems configured to receive information from computing components in system 100, process the information, and generate marketing control signals to be sent to other computing components in system 100, according to the illustrative methods described herein. Campaign control systems 108 may include any type or combination of computing systems, such as clustered computing machines and/or servers, including virtual computing machines and/or virtual servers. Campaign control systems 108 may include, for example, implementations of Adlearn Open Platforms (AOP) control systems offered by America Online (AOL) of New York, N.Y. In some embodiments, campaign control systems 108 may include an assembly of hardware, including a memory 112, a central processing unit ("CPU"), and/or a user interface 116. Memory 112 may include any type of RAM or ROM embodied in a physical, computer-readable storage medium, such as magnetic storage including floppy disk, hard disk, or magnetic tape; semiconductor storage such as solid state disk (SSD) or flash memory; optical disc storage; or magneto-optical disc storage. In addition, memory may include executable instructions that, when executed by CPU 114, can implement a cost estimator 118 (e.g., cost estimator 350 of FIG. 3, or cost estimator 400 of FIG. 4) that can output a cost estimate with a controlled volatility and/or responsiveness. This could be accomplished by translating a desired relative volatility to a specific estimator gain, as described in detail herein. The desired relative volatility may be, for example, a user (e.g., marketer) defined value. CPU 114 may include one or more processors for processing data according to instructions stored in the memory, for example to perform the methods and processes discussed in detail herein. The functions of the processor may be provided by a single dedicated processor or by a plurality of processors. Moreover, the processor may include, without limitation, digital signal processor (DSP) hardware, or any other hardware capable of executing software. User interface 116 may include any type or combination of input/output devices, such as a display monitor, graphical user interface, touch-screen or pad, keyboard, and/or mouse. In other embodiments, campaign control systems 108 may include virtual representations of hardware operating, for example, on a virtualization server.

Figure 2:
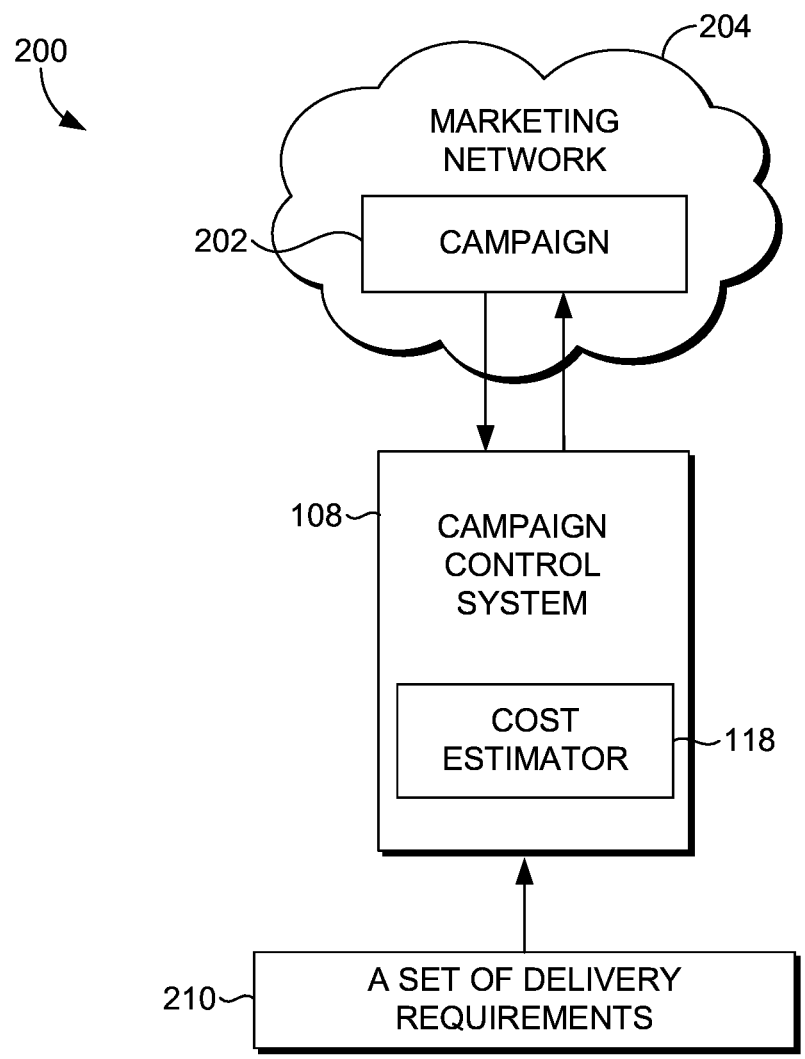
FIG. 2 depicts an illustrative online marketing control system for controlling an online marketing campaign operating in an online marketing network, in accordance with various embodiments of the present disclosure.

FIG. 2 depicts an illustrative online marketing environment 200 for controlling an online marketing campaign 202 operating in an online marketing network 204. Marketing network 204 may include a network or collection of one or more marketers 102, one or more publishers 104, marketing servers 106, campaign control systems 108, or other components of system 100. Elements of marketing network 204 may operate to receive impression requests associated with one or more marketing inventories, e.g., from publishers 104 such as websites or other computing components with an inventory of online marketing space. Marketing network 204 may also group impression requests for various marketing campaigns, e.g., according to impressions to be "targeted" based on a combination of attributes defined by the marketing requests. Marketing network 204 may also accept bids (e.g., from one or more campaign control systems 108) on the impression requests and process the bids to serve ads to the impression requests.

Any number or type of marketing campaigns 202 may be operated within marketing network 204, across various marketing servers and domains associated with the Internet. Online marketing environment 200 may be implemented by one or more of the marketers 102, publishers 104, marketing servers 106, and/or campaign control systems 108 described in FIG. 1. For example, online marketing environment 200 may represent the interaction of one or more campaign control systems 108 with other computing components in system 100.

Figure 7:
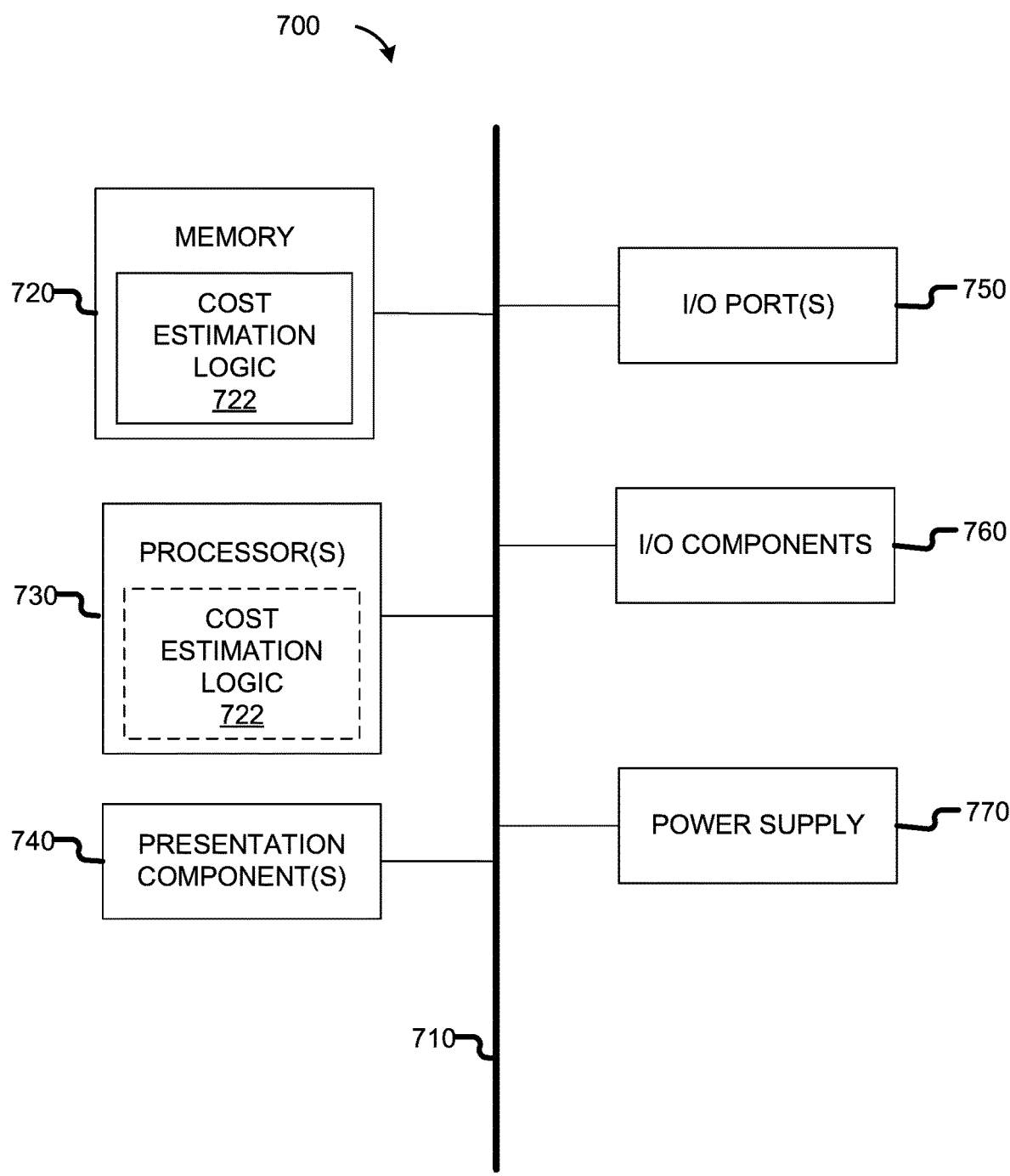
FIG. 7 is a block diagram of an example computing device in which various embodiments of the present disclosure may be employed.

In one embodiment, online marketing environment 200 may include one or more instances of campaign control system 108. Campaign control system 108 may comprise computers or servers connected to the Internet. Such computers or servers may be configured as described with respect to campaign control system 108, as depicted by FIGS. 1 & 7, or in any other suitable configuration. Alternatively, campaign control system 108 may be implemented by software modules executed by CPUs 114 of campaign control system 108. Campaign control system 108 may be embodied entirely in hardware, entirely in software, or in any combination of hardware and software implemented across any number of computing devices.

Campaign control system 108 may be provided with a set of delivery requirements 210, which may be adjustable design parameters set by a user. For instance, the set of delivery requirements may include cost requirements (e.g., the maximum cost discussed in reference FIG. 3), pacing requirements (e.g., daily budget goals, daily impression delivery goals), targeting requirements (e.g., based on a demographic analysis), volatility requirements (e.g., desired relative volatility) and/or spread requirements (e.g. to control marketing across inventory units/cells/segments, and/or user targets, etc.). The set of delivery requirements 210 may be implemented by campaign control system 108. For example cost estimator 118 may be configured to produce a cost estimate with a controlled volatility and/or responsiveness. This could be accomplished by translating a desired relative volatility to a specific estimator gain, as described in detail herein. The desired relative volatility may be, for example, a user (e.g., marketer) defined value.

Figure 3:
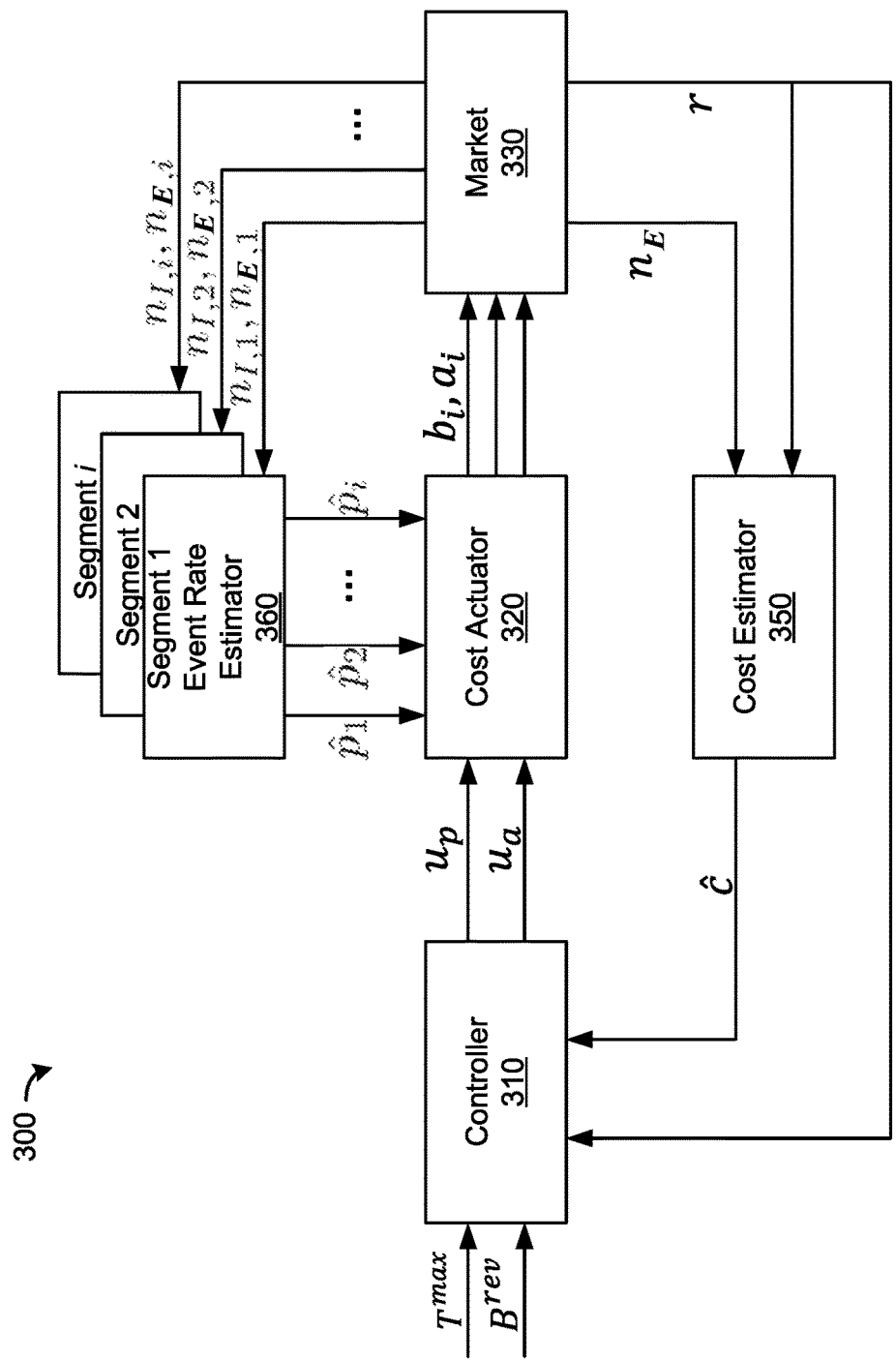
FIG. 3 depicts an illustrative campaign control system with a cost estimator, in accordance with various embodiments of the present disclosure.

FIG. 3 depicts a block diagram of a portion of an illustrative campaign control system 300 for controlling online marketing campaigns, in accordance with various embodiments of the present disclosure. Campaign control system 300 may generally be configured to utilize data previously observed in market 330. This data can be utilized to control subsequent bids placed in market 330 to facilitate, for example, obtaining the desired pacing, and/or delivery, at or below a cost limit set by the marketer. As depicted, campaign control system 300 includes a controller 310 (e.g., campaign control system 108 of FIG. 2), a cost actuator 320, a market 330, a cost estimator 350, and a plurality of segment performance rate estimators 360. Each of these components may be communicatively coupled with one another, for example, as depicted in FIG. 3. This communicative coupling may be, for example, via a bus, network, shared memory, etc., or any combination thereof.

Cost estimator 350 is configured to take as input an observed event volume, $n_E$; and observed revenue, or pacing, r. The observed event volume and the observed revenue can be determined from actual event volume and revenue observed in market 330. The observed event volume and/or the observed revenue may be a moving average calculated over a period of time. This period of time can be any duration of time that may be selected based upon certain campaign characteristics. For example, a shorter period of time can enable quicker reflection of changes in market 330, however the results could be noisier than those of a moving average calculated over a longer period of time. A moving average calculated over a longer period of time, on the other hand, can be less noisy than a moving average calculated over a shorter period of time, but is slow to react to changes in market 330. As a result, the time period for such a moving average may be dependent on the campaign and/or volatility of market 330. The above discussed moving average may be calculated by a moving average filter that could be located in-line between market 330 and cost estimator 350. Discrete observed event volume and observed revenue in market 330 may be monitored, for example, via an event volume sensor and a revenue sensor configured to obtain real-time data about the campaign to which campaign control system 300 is assigned. Cost estimator 350 may produce an estimated cost, ĉ, based, at least in part on, the observed event volume, $n_E$, and the observed revenue, r. Cost estimator 350 can be configured to produce the cost estimate with a controlled volatility and/or responsiveness. This could be accomplished by translating a desired relative volatility to a specific estimator gain, as described in detail herein. The desired relative volatility may be, for example, a user (e.g., marketer) defined value.

Campaign controller 310 is configured to take as input a max cost reference signal, $T^{max}$, hereinafter merely referred to as max cost. Max cost may be a user (e.g., marketer) defined maximum cost that the user is willing to pay for an event. As used herein, event refers to any action taken with an advertisement (e.g., impression, click, or conversion). In embodiments, max cost may represent the maximum average cost the user is willing to pay for each event, the maximum discrete cost the user is willing to pay for each event, or any other suitable cost restriction.

Campaign controller 310 is also configured to take as input a desired pacing reference signal, $B^{rev}$. Desired pacing may be user defined and may also be referred to as a maximum desired revenue or a maximum budget. As used herein, revenue may refer to actual dollars spent or actual events delivered. As such, desired pacing may be expressed as monetary units (e.g., dollars) or as a number of events. For example, if a marketing campaign has a daily budget of $900 and has spent $800 in a given day, observed pacing for the campaign on that given day is $800. Campaign controller 310 is also configured to take as input the observed pacing, r, and the cost estimate, ĉ, which was produced by cost estimator 350.

Campaign controller 310 is configured to determine a price control signal, $u_p$. The price control signal, $u_p$, can be calculated based, at least in part, on the max cost, desired pacing, observed pacing, and cost estimate. This function may be configured to attempt to facilitate obtaining the desired pacing within the limits of max cost and/or inventory available in market 330. In some embodiments, an allocation control signal, $u_a$, can also be calculated by campaign controller 310. Such an allocation control signal represents the percentage or ratio (e.g., point value from 0 to 1) of inventory the ad campaign is willing to purchase at the bid price discussed below.

In some embodiments, campaign controller 310 is configured to periodically update the price control signal, $u_p$, as well as allocation control signal, $u_a$, if utilized. These periodic updates may take place at predefined time intervals (e.g., every 15 minutes), based on a specific occurrence (e.g., based on a magnitude of change to observed pacing), or any other suitable period. In other embodiments, campaign controller 310 may update the price control signal, $u_p$, in real time as the above discussed signals change.

Segment performance rate estimators 360 are configured to take as input an observed impression volume for a segment, $n_{I,i}$, and an observed event volume for the segment, $n_{E,i}$. The 'i' refers to the segment in which the observed impression volume and the observed event volume were observed. As used herein a segment refers to a defined portion of market 330. Such a segment may be, for example, a website, a group of individuals identified by demographic analysis (e.g., males between the age of 25 and 35 in California), a distinct individual, etc. A segment may also e.g. be referred to in the art, and herein, as a cell or unit. The observed impression volume, $n_{I,i}$, and the observed event volume, $n_{E,i}$ for each segment can be determined from actual observations in market 330 pertaining to the respective segment. Discrete observed impression volumes for the segments and discrete observed event volumes for the segments may be monitored in market 330, for example, via segment impression sensors (not depicted) and segment event sensors (not depicted), respectively, configured to obtain real-time data about the segment to which these components are assigned. Segment performance rate estimator 360 can output a performance prediction, $\hat{p}_i$, for each segment ('i').

Cost actuator 320 takes the price control signal, $u_p$, and allocation control signal, $u_a$, as input. In addition, cost actuator 320 can take the one or more segment performance predictions, $\hat{p}_i$, as input. Again, the 'i' refers to the segment to which the segment performance prediction belongs. Cost actuator may utilize the combination of the price control signal, $u_p$, the allocation signal, $u_a$, and the segment performance predictions, $\hat{p}_i$, to calculate a bid price, $b_i$, and an allocation at that bid price, $a_i$, for the respective segment. In some embodiments, the bid price, $b_i$, is calculated by taking the product of $u_p$ and $\hat{p}_i$, for each i. These bids are depicted by the individual arrows flowing from cost actuator 320 to market 330. In other embodiments, the bid price may be a capped segment bid price calculated, for example, using the equation $b_i = \min(\text{maxCPI}, u_p \hat{p}_i)$, where maxCPI is max cost per impression, or, as another example, equation $b_i = \min(\text{maxCPI}_i, u_p \hat{p}_i)$, where $\text{maxCPI}_i$ is max cost per impression for segment i. It will be appreciated by someone of ordinary skill in the art that these examples are merely meant to illustrative and are not intended to limit the scope of this disclosure. For example, min can be replaced by max and/or the min (max) operation may be conditional based on user, ad, or impression specific information. In addition, the capping may apply only for a certain type of user, a certain time of the day, in a certain geographic region, etc.

Market 330 represents a bidding environment in which advertisers place ad requests for marketing space that is offered by publishers. The above discussed components facilitate a marketer in obtaining the desired pacing within the limits of max cost $T^{max}$ and/or inventory available in marketing market 330.

Figure 4:
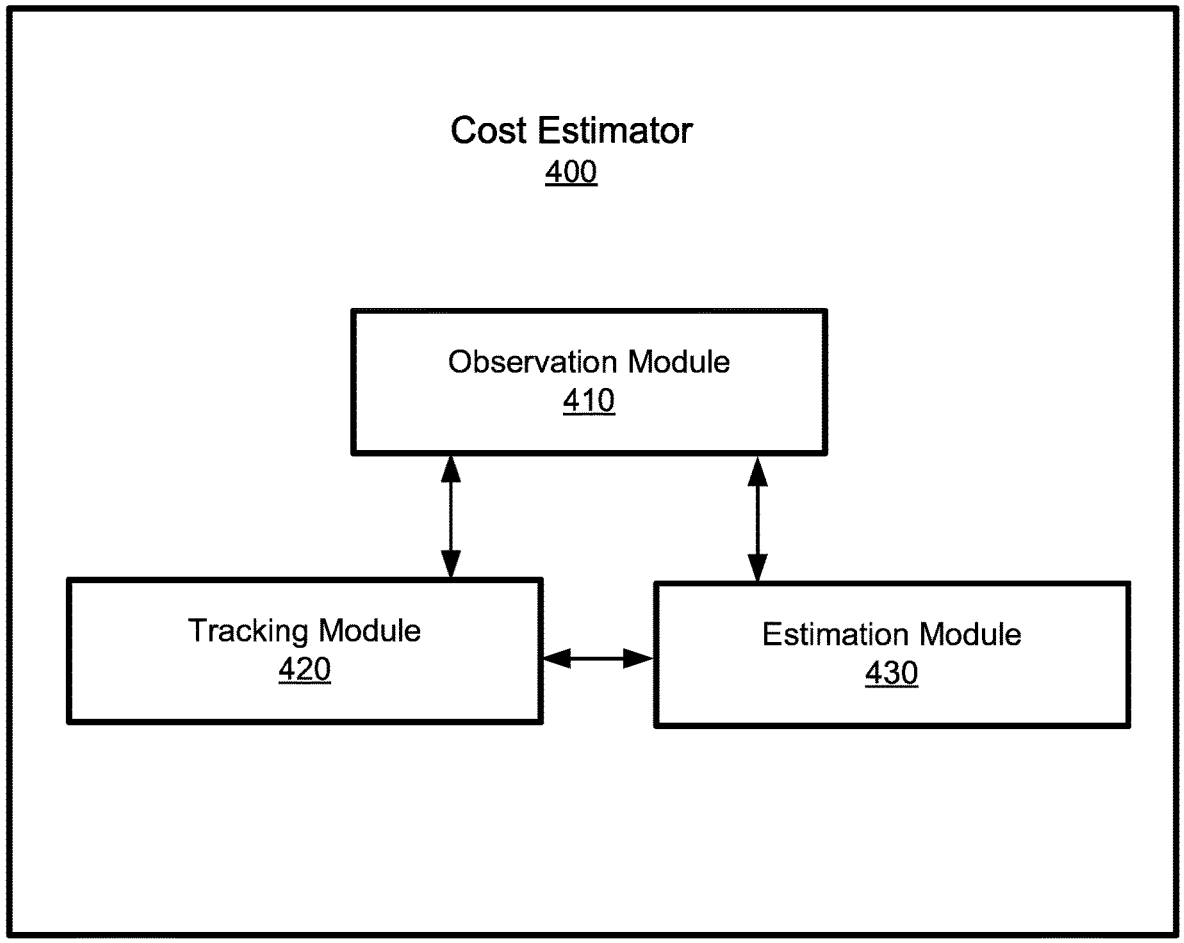
FIG. 4 depicts an illustrative cost estimator, in accordance with various embodiments of the present disclosure.

Referring now to FIG. 4, a schematic diagram illustrates an example cost estimator 400 (e.g., cost estimator 350 of FIG. 3) in accordance with various embodiments of the present disclosure. Cost estimator 400 can provide estimated average cost per event with a controlled volatility by translating a relative volatility of events per revenue to a specific estimator gain. It will be appreciated that the events per revenue merely represents an inverse of the cost per event, thus, the translation of relative volatility of events per revenue to a specific estimator gain can be transformed into a relationship between the estimator gain and a cost estimate volatility. In some embodiments, cost estimator 400 includes observation module 410, tracking module 420, and estimation module 430, operatively and/or communicatively coupled with one another.

In embodiments, observation module 410 can observe an event volume, represented herein by $n_E(k)$, and revenue, represented herein by $r(k)$, of a campaign, where 'k' refers to a current logical interval, or state, of the campaign. In operation, a campaign may be logically or arbitrarily divided into various logical intervals. Logical intervals may be uniformly divided time intervals, such as based on second, minute, hour, day, week, month, or so on. In addition, logical intervals may be logically tied with certain units or milestones in a campaign. Such units may relate to orders of a product or services after launching the campaign, e.g., every thousand orders. Such units may also, or alternatively, include a unit of budget spend on the campaign, e.g., every thousand dollars. In these cases, where the logical intervals are logically tied with certain units or milestone in a campaign, the logical intervals may be considered heterogeneous time intervals.

In some embodiments, observation module 410 may receive the observed event volume and observed revenue, from another computing device, or via input from a user (e.g., as an initialization setting where a previous logical interval has yet to occur). The observed event volume can include, for instance, impressions, clicks, and/or conversions.

As depicted, observation module 410 is coupled with tracking module 420. Tracking module 420 can track state information of multiple state variables, such as those discussed below, from previous logical intervals. This state information from a previous logical interval can be used by estimation module 430 to provide cost estimates for a present logical interval. For example, tracking module 420, can track state variables for estimating a revenue rate (e.g., $\alpha_r(k)$ and $\beta_r(k)$) hereinafter referred to as revenue state variables, and state variables for estimating events per revenue (e.g., $\alpha_\rho(k)$ and $\beta_\rho(k)$), hereinafter referred to as events per revenue state variables. In some embodiments, as the campaign evolves, tracking module 420 may only need to keep the state information from the immediately preceding logical interval (i.e., the last state).

In embodiments, estimation module 430 can take as input observed event volume and revenue for a current state, which can be received from observation module 410, and state variables from a previous state from tracking module 420. From these inputs, estimation module 430 can provide cost estimates for the present logical interval (i.e., the present state). In various embodiments, such estimation may be based at least in part on the state information, e.g., tracked by tracking module 420; and the observed event volume and observed revenue in the current logical interval, (e.g., $n_E(k)$ and $r(k)$ respectively), observed by observation module 410. Such estimation may be further based at least in part on a revenue forgetting factor ($\lambda_r$) and an events per revenue forgetting factor ($\lambda_\rho$), discussed in greater detail below. Additionally, such estimation may be further based at least in part on a relative volatility reference parameter ($\sigma_{ref}$), also discussed in greater detail below.

In operation, estimation module 430 may store, receive, or otherwise have access to various configuration parameters for providing cost estimates. For instance, estimation module 430 may access the initialization values for the revenue forgetting factor ($\lambda_r$), which could, for example, be user defined; the relative volatility reference parameter ($\sigma_{ref}$), which again could be user defined; and the initialization values for various state variables which, yet again, could be user defined. For example, for revenue rate estimation, estimation module 430 may access initialization values $\alpha_{r,0}$ and $\beta_{r,0}$, and can assign these initialization values to initial states $\alpha_r(0)$ and $\beta_r(0)$, respectively. In addition, for events per revenue estimation, estimation module 430 may access initialization values $\alpha_{\rho,0}$ and $\beta_{\rho,0}$, and can assign these initialization value to initial states $\alpha_\rho(0)$ and $\beta_\rho(0)$, respectively.

The revenue forgetting factor ($\lambda_r$) may be utilized to discount the importance of revenue state variables associated with the previous logical interval in updating values of these revenue related state variables for a present logical interval. As an example, consider the following equation:

$$\alpha_r(k) = \lambda_r^h \alpha_r(k-1) + r(k) \qquad \text{Eq. 1}$$

where $\alpha_r(k)$ represents a first revenue state variable at a current state, k; $\lambda_r^h$ represents a revenue forgetting factor; $\alpha_r(k-1)$ represents the first revenue state variable at a previous state, k−1; and $r(k)$ represents the observed revenue in the current state. The variable 'h' in Eq. 1 is an indicator of the length of time of the logical interval. For example, if the logical interval is ten minutes, then 'h' would be ten. As such, as the logical interval increases, the effect of the revenue forgetting factor would be increased. In contrast, as the logical interval decreases, the effect of the revenue forgetting factor would be reduced. It will be appreciated that the variable 'h' can be omitted from some embodiments, without departing from the scope of this disclosure. From Eq. 1, it can be seen that a forgetting factor $\lambda_r$ that is between than 0 and 1 would act to reduce the impact of the previous state, $\alpha_r(k-1)$, on the current state, $\alpha_r(k)$. In addition, it would follow that a $\lambda_r$ that is closer to 0 would more greatly discount the impact of the previous state on the current state than a $\lambda_r$ that is closer to 1. As such, adjusting $\lambda_r$ between 0 and 1 can affect the volatility of the first revenue state variable from one state to the next.

Similarly, consider the following equation:

$$\beta_r(k) = \lambda_r^h \beta_r(k-1) + 1 \qquad \text{Eq. 2}$$

where $\beta_r(k)$ represents a second revenue state variable at a current state, k; $\lambda_r^h$ again represents a revenue forgetting factor, where 'h' again is dependent on the length of time of the logical interval; and $\beta_r(k-1)$ represents the second revenue state variables at a previous state, k−1. From this equation, it can also be seen that a forgetting factor λr that is between than 0 and 1 would act to reduce the impact of the previous state, $\beta_r(k-1)$, on the current state, $\beta_r(k)$. In addition, as above, it would follow that a $\lambda_r$ that is closer to 0 would more greatly discount the impact of the previous state on the current state than a $\lambda_r$ that is closer to 1. As such, adjusting $\lambda_r$ between 0 and 1 can affect the volatility of the second revenue state variable from one state to the next.

Estimation module 430 may calculate values for the revenue state variables ($\alpha_r(1)$ & $\beta_r(1)$) based on an initial revenue state ($\alpha_r(0)$ and $\beta_r(0)$). Estimation module 430 can then recursively update the revenue state variables based at least in part on the observed revenue (r(k)) and the revenue forgetting parameter ($\lambda_r$). As shown in Eq. 1 and Eq. 2, revenue state variables $\alpha_r(k)$ and $\beta_r(k)$, in a current state, k, can be updated based on their values in a previous state, k−1, and the observed revenue, r(k). Estimation module 430 may then determine an estimated revenue rate ($\hat{v}(k)$) for the present state based on the revenue related state variables, $\alpha_r(k)$ and $\beta_r(k)$. An example of such a determination is represented by Eq. 3

$$\hat{v}(k) = \frac{\alpha_r(k)}{\beta_r(k)} \qquad \text{Eq. 3}$$

where $\hat{v}(k)$ represents the estimated revenue rate at a current state, k.

Estimation module 430 may determine an event per revenue estimate of the current state (k). Such a calculation can be based on the events per revenue state variables of the previous state (k−1). An example of such a calculation is depicted in Eq. 4.

$$\hat{\rho}_{old}(k) = \frac{\alpha_\rho(k-1)}{\beta_\rho(k-1)} \qquad \text{Eq. 4}$$

The calculations of, $\alpha_\rho(k-1)$ and $\beta_\rho(k-1)$ beyond the initialization state are discussed in greater detail below, in reference to Eq. 7 and Eq. 8.

Estimation module 430 may also calculate a tentative events per revenue forgetting factor for the current state. An example equation for calculating such a tentative events per revenue forgetting factor is presented by Eq. 5

$$\lambda'_\rho(k) = 1 - 2\sigma_{ref}^2 \hat{v}(k) \hat{\rho}_{old}(k) \qquad \text{Eq. 5}$$

where $\lambda'(k)$ refers to the tentative events per revenue forgetting factor at state k; $\sigma_{ref}$ represents the aforementioned volatility reference parameter; $\hat{v}(k)$ represents the previously calculated estimated revenue rate; and $\hat{\rho}_{old}(k)$ represents the previously calculated events per revenue estimate.

The above calculated tentative events per revenue forgetting factor can be utilized by estimation module 430 to determine an actual events per revenue forgetting factor, $\lambda_\rho(k)$, hereinafter merely referred to as an events per revenue forgetting factor. In some embodiments, estimation module 430 may set, or receive user inputs setting, a minimum value ($\lambda_{\rho\_min}$) and a maximum value ($\lambda_{\rho\_max}$) as bounds for the events per revenue forgetting factor, $\lambda_\rho(k)$, at the current state, k. Estimation module 430 may then be configured to maintain the events per revenue forgetting factor, $\lambda_\rho(k)$, between the minimum value ($\lambda_{\rho\_min}$) and the maximum value ($\lambda_{\rho\_max}$). An example equation for maintaining the actual events per revenue forgetting factor is depicted by Eq. 6.

$$\lambda_\rho(k) = \begin{cases} \lambda_{\rho,min}^h, & \text{if } \lambda'_\rho(k) < \lambda_{\rho,min} \\ \lambda'_\rho(k), & \text{if } \lambda_{\rho,min} \leq \lambda'_\rho(k) \leq \lambda_{\rho,max} \\ \lambda_{\rho,max}^h, & \text{if } \lambda'_\rho(k) > \lambda_{\rho,max} \end{cases} \qquad \text{Eq. 6}$$

From the equation above, it can be seen that the events per revenue forgetting factor, $\lambda_\rho(k)$, can be set equal to the previously calculated tentative events per revenue forgetting factor, $\lambda'_\rho(k)$, if the tentative events per revenue forgetting factor is between the above mentioned bounds, $\lambda_{\rho\_min}$ and $\lambda_{\rho\_max}$, or equal to either of these bounds. If, on the other hand, the tentative events per revenue forgetting factor, $\lambda'_\rho(k)$, falls below $\lambda_{\rho\_min}$ or exceeds $\lambda_{\rho\_max}$, then the actual events per revenue forgetting factor, $\lambda_\rho(k)$, is set to the bound that the tentative events per revenue forgetting factor, $\lambda'_\rho(k)$, fell below or exceeded.

Similar to how the revenue related state variables are updated above, the events per revenue state variables, $\alpha_\rho(k)$ and $\beta_\rho(k)$, in current state (k), can also be updated recursively based on the events per revenue state variable values from the previous state, (k−1). To accomplish this, as mentioned previously, estimation module 430 may set values for initial states of the events per revenue state variables, $\alpha_\rho(0)$ and $\beta_\rho(0)$, to initialization values $\alpha_{\rho,0}$ and $\beta_{\rho,0}$, respectively. The events per revenue state variables, $\alpha_\rho(0)$ and $\beta_\rho(0)$, may be referred to herein, respectively, as first and second events per revenue state variables. Initialization values $\alpha_{\rho,0}$ and $\beta_{\rho,0}$ can be based, for example, on some default or initial values set by a user. The events per revenue state variables, $\alpha_\rho(k)$ and $\beta_\rho(k)$, can then be recursively updated based on the events per revenue forgetting factor, $\lambda_\rho(k)$. Additionally, in some embodiments, the observed event volume, $n_E(k)$, and the observed revenue, r(k), in the current state, may also be used as the basis to update events per revenue state variables $\alpha_\rho(k)$ and $\beta_\rho(k)$. Example equations for recursively updating the events per revenue related state variables are depicted by Eq. 7 and Eq. 8.

$$\alpha_\rho(k) = \gamma^h \lambda_\rho(k) \alpha_\rho(k-1) + (1-\gamma^h) \alpha_{\rho,0} + n_E(k) \qquad \text{Eq. 7}$$

$$\beta_\rho(k) = \gamma^h \lambda_\rho(k) \rho_\rho(k-1) + (1-\gamma^h) \beta_{\rho,0} + r(k) \qquad \text{Eq. 8}$$

where $\gamma$ represents a drift/bias term towards the previous state; $\lambda_\rho$ represents the events per revenue forgetting factor; $\alpha_\rho(k-1)$ and $\beta_\rho(k-1)$ represent the events per revenue state variables from the previous state, k−1; $\alpha_{\rho,0}$ and $\beta_{\rho,0}$ represent the initialization values of the events per revenue state variables; $n_E(k)$ represents the observed event volume observed in the current state; and r(k) represents the observed revenue observed in the current state. In some specific embodiments, $\gamma$ can be set smaller than, but very close to 1. In a specific embodiment, $\gamma$ can be chosen so that it is larger than any anticipated $\lambda_\rho$ (e.g. larger than $\lambda_{\rho\_max}$). Such a $\gamma$ can aid in avoiding numerical instability (e.g., by preventing division by zero in Eq. 9, discussed below) in the corner case where $n_E=r=0$ over a period of time.

From equations 7 and 8, it can be seen that a forgetting factor $\lambda_\rho$ that is between 0 and 1 would act to reduce the impact of the previous state, $\alpha_\rho(k-1)$ and $\beta_\rho(k-1)$, on the current state, $\alpha_\rho(k)$ and $\beta_\rho(k)$, respectively. In addition, it would follow that a $\lambda_\rho$ that is closer to 0 would more greatly discount the impact of a previous state on a calculation of the current state than a $\lambda_\rho$ that is closer to 1. As such, adjusting $\lambda_\rho$ between 0 and 1 can affect the volatility of the events per revenue state variables from one state to the next. As an example, as $\lambda_\rho(k)$ approaches $\lambda_{\rho\_min}$, $\alpha_\rho(k)$ and $\beta_\rho(k)$ will depend less on the previous state and more on the observed event volume, $n_E(k)$, rather than the previous state variable value of $\alpha_\rho(k-1)$.

Similarly, in this case, $\beta_\rho(k)$ will depend more on the observed revenue, r(k), rather than the previous state variable value of $\beta_\rho(k-1)$. On the other hand, when $\lambda_\rho(k)$ approaches $\lambda_{\rho\_max}$, $\alpha_\rho(k)$ and $\beta_\rho(k)$ will depend more on the values in the previous state, namely $\alpha_\rho(k-1)$ and p (k−1) respectively.

Because 'ρ' represents the number of events per unit of revenue, e.g., number of events per cost, and can be estimated in accordance with equation 4, it would follow that the estimated cost per event could be calculated by taking the inverse of ρ. As such, the cost per event estimate (ĉ(k)), hereinafter referred to merely as cost, may be obtained, for example, according to Eq. 9.

$$\hat{c}(k) = \frac{\beta_\rho(k)}{\alpha_\rho(k)} \quad \text{Eq. 9}$$

Recall that $\sigma_{ref}$, as used in Eq. 5, can be used by estimation module 430 to keep a volatility of the cost estimation at a predefined desired relative volatility. In various embodiments, a value can be set for $\sigma_{ref}$ and update the events per revenue forgetting factor ($\lambda_\rho$) based at least in part on the relative volatility reference parameter $\sigma_{ref}$ to keep the volatility of the cost estimation at the level associated with $\sigma_{ref}$. Generally, setting higher value for $\sigma_{ref}$ will introduce lower value for $\lambda_\rho$, thus causing the cost estimation to be more responsive to recently observed event volume and revenue. On the contrary, setting lower value for $\sigma_{ref}$ will introduce higher value for $\lambda_\rho$, thus causing the cost estimation to be less volatile or less susceptible to recently observed event volume and revenue.

In various embodiments, estimation module 430 may relate the estimator gain (i.e., the events per revenue forgetting factor $\lambda_\rho$) to the temporal volatility of the cost estimate. As used herein, temporal volatility can refer to the standard deviation of the cost estimate divided by the true cost over a period of time. In such embodiments, each set of values for estimated revenue rate, estimated events per revenue, and estimator gain correspond to a unique steady state relative volatility, or relative temporal volatility, of the cost estimate. As such, if reasonably good estimates (e.g., within a certain level of error) are made for estimated revenue rate and estimated events per revenue, there is a unique mapping between estimator gain and (steady-state) relative volatility of the cost estimate. In other words, each value of estimator gain corresponds to a unique value of (steady-state) relative volatility, or standard deviation, of the cost estimate. Generally, a desired relative volatility may be translated into a specific events per revenue forgetting factor ($\lambda_\rho$). Hence, the gain can be selected adaptively to ensure the relative volatility remains at a certain level, or remains no larger than at a certain level. The gain can be updated adaptively based on the estimated revenue rate ($\hat{v}(k)$) and the estimated events per revenue ($\hat{\rho}_{old}(k)$). As an example, if the estimated revenue rate and the estimated events per revenue are good estimates (e.g., within a certain margin of error) the estimator gain can be set to a specific value in order to obtain a relative temporal volatility equal to $\sigma_{ref}$.

In the meantime, estimation module 430 also maintains the $\lambda_\rho(k)$ between the minimum value ($\lambda_{\rho\_min}$) and the maximum value ($\lambda_{\rho\_max}$), (e.g., in accordance with Eq. 6). Therefore, estimation module 430 can adjust the aggressiveness (e.g., update $\lambda_\rho(k)$) based on the estimated revenue rate ($\hat{v}(k)$) and previous cost estimate ($\hat{c}(k-1)$) to trade volatility for response time. In particular, utilizing $\lambda_\rho(k)$, estimation module 430 may make the cost estimate ($\hat{c}(k)$) less volatile (at the expense of response time) and non-volatile cost estimates more responsive. In a particular embodiment, by setting $\lambda_{\rho\_min}=0$ and $\lambda_{\rho\_max}=1$, all cost estimates will have the same relative volatility at a steady state.

Figure 5:
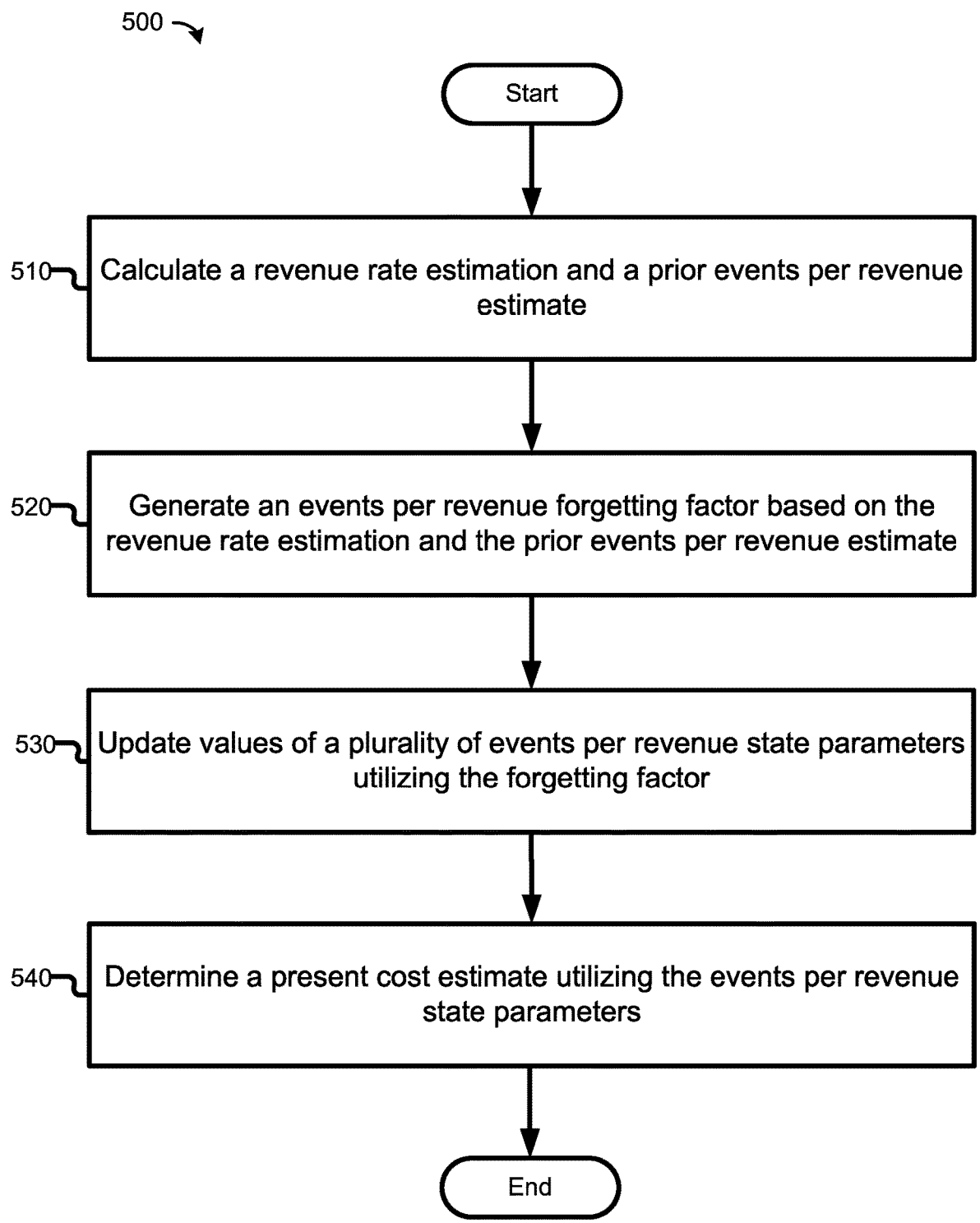
FIG. 5 depicts an illustrative process flow for adaptively estimating an average cost per event, in accordance with various embodiments of the present disclosure.

FIG. 5 depicts an illustrative process flow 500 for adaptively determining a cost estimate, in accordance with various embodiments of the present disclosure. Process 500 may be performed by processing logic that comprises hardware (e.g., circuitry, dedicated logic, programmable logic, microcode, etc.), software (e.g., instructions run on a processing device to perform hardware simulation), or any combination thereof and configured to provide cost estimates. As such, process 500 may be performed by a computing device, e.g., cost estimator 400 of FIG. 4, to implement one or more embodiments of the present disclosure. In various embodiments, process 500 can have fewer or additional operations, or perform some of the operations in different orders.

In various embodiments, the process begins at block 510, where a revenue rate estimate and a prior events per revenue estimate may be calculated, e.g., by estimation module 430 of FIG. 4. In one embodiment, the revenue rate estimate ($\hat{v}(k)$) for the present logical interval (e.g., state (k)) is calculated based at least in part on the observed revenue (r(k)) in a current logical interval. In such an embodiment, the prior events per revenue estimate ($\hat{\rho}_{old}(k)$) can be calculated based on values of state variables (e.g., $\alpha_\rho(k-1), \beta_\rho(k-1)$) associated with the previous logical interval, e.g., according to Eq. 1, Eq. 2, Eq. 3, and Eq. 4 as discussed herein.

At block 520, an event per revenue forgetting factor (e.g., $\lambda_\rho$) may be generated, (e.g., by estimation module 430 of FIG. 4) based on the expected revenue rate estimation and the prior events per revenue estimate. The value of this events per revenue forgetting factor may be kept between 0 and 1. Thus, this events per revenue forgetting factor may be adaptively updated to discount the contribution of values of those relevant state variables associated with the previous logical interval when the events per revenue forgetting factor is updated, e.g., according Eq. 5 and Eq. 6 as discussed herein.

According to Eq. 5 and Eq. 6, the forgetting factor ($\lambda_\rho(k)$) is correlated with the revenue rate estimation ($\hat{v}(k)$) and the prior events per revenue rate estimation ($\hat{\rho}_{old}(k)$). As can be seen in Eq. 5 and Eq. 6, the forgetting factor ($\lambda_\rho(k)$) will increase in the current state compared to the previous state when the revenue rate estimation ($\hat{v}(k)$) or the prior events per revenue rate estimate ($\hat{\rho}_{old}(k)$) decreases from the previous state. Similarly, the forgetting factor ($\lambda_\rho(k)$) will decrease in the current state compared to the previous state when the revenue rate estimation ($\hat{v}(k)$) or the prior events per revenue rate estimate ($\hat{\rho}_{old}(k)$) increases from the previous state.

At block 530, the events per revenue state variables, e.g., $\alpha_\rho(k)$ and $\beta_\rho(k)$, may be recursively updated. In embodiments, a first events per revenue state variable, $\alpha_\rho(k)$, can be recursively updated based at least in part on the observed event volume observed in the current state ($n_E(k)$ and the events per revenue forgetting factor ($\lambda_\rho(k)$), e.g., based on Eq. 7. Similarly, a second events per revenue state variable, $\rho_\rho(k)$, may be updated based at least in part on the observed revenue observed in the current state $\beta_p(k)$) and the events per revenue forgetting factor ($\lambda_\rho(k)$), e.g., based on Eq. 8.

At block 540, the cost estimate for the current state (e.g., ĉ(k)) may be determined (e.g., by estimation module 430 of FIG. 4). In some embodiments, ĉ(k) may be determined based at least in part on the observed event volume in the current state (e.g., $n_E(k)$), the observed revenue in the current state (e.g., r(k)), and the events per revenue forgetting factor ($\lambda_\rho(k)$) for the current state, e.g., based on Eq. 7, Eq. 8, and Eq. 9 as discussed herein.

In various embodiments, the events per revenue forgetting factor ($\lambda_\rho(k)$) may be updated based further on a volatility reference parameter, e.g., $\sigma_{ref}$, as used in Eq. 5. The volatility reference parameter may be set in a way to keep the volatility of the cost estimation at a prescribed volatility level.

Figure 6:
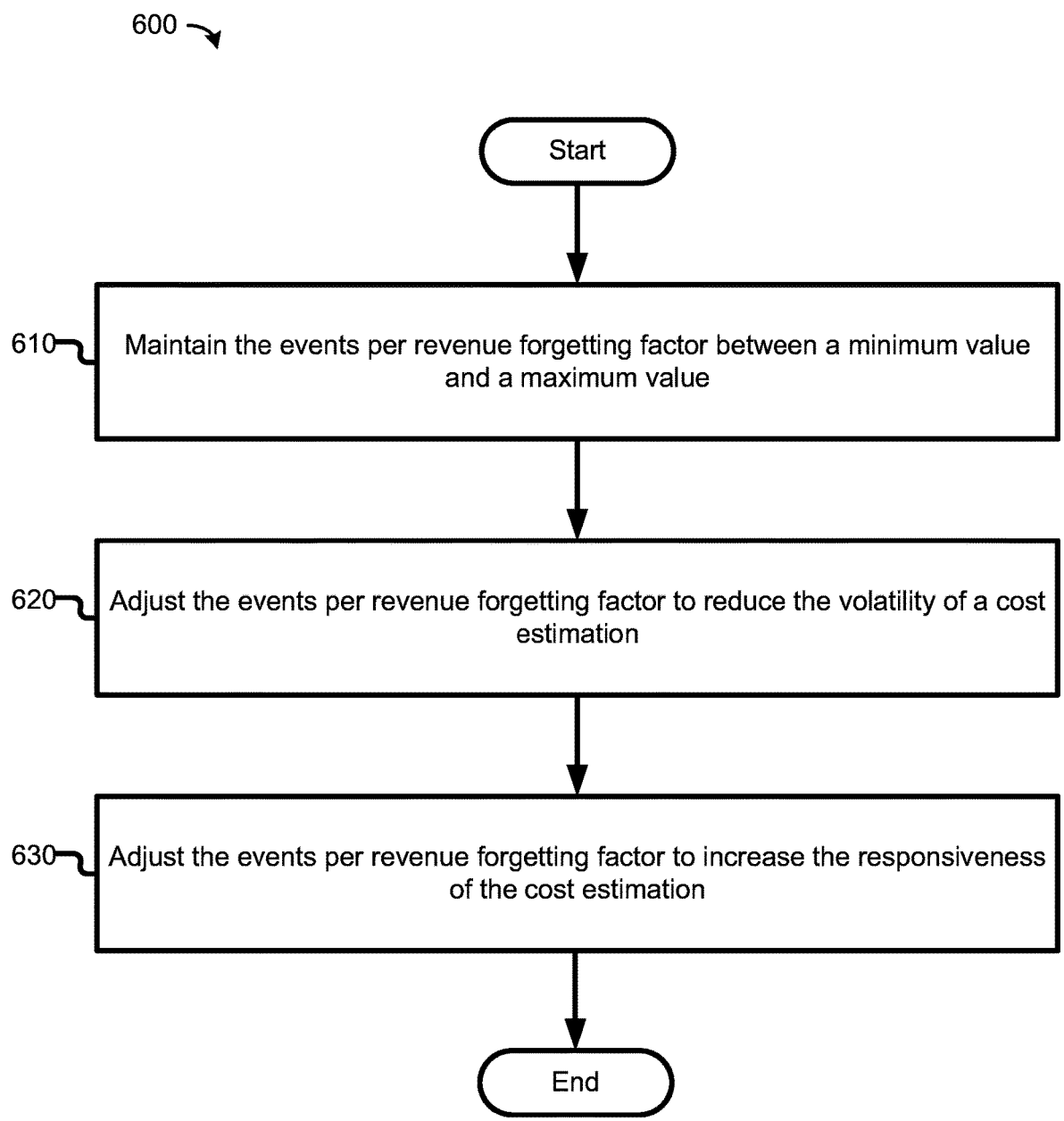
FIG. 6 depicts an illustrative process flow for adjusting a forgetting factor for adaptive average cost per event estimation, in accordance with various embodiments of the present disclosure.

FIG. 6 depicts an illustrative process flow for adjusting a events per revenue forgetting factor for cost estimation, in accordance with various embodiments of the present disclosure. Process 600 may be performed, for example, by cost estimator 400 to implement one or more embodiments of the present disclosure. In various embodiments, process 600 may be performed in reference to block 520 of FIG. 5. In various embodiments, various blocks in FIG. 6 may be combined or arranged in any suitable order, e.g., according to the particular embodiment of cost estimator 400 for generating cost estimates.

In various embodiments, the process may begin at block 610, where the events per revenue forgetting factor ($\lambda_\rho$) may be maintained between a minimum value ($\Delta_{\rho\_min}$) and a maximum value ($\lambda_{\rho\_max}$), e.g., by estimation module 430 of FIG. 4. The minimum value ($\lambda_{\rho\_min}$) and the maximum value ($\lambda_{\rho\_max}$) may be configurable parameters, e.g., set by estimation module 430 or a user. Generally, the minimum value ($\lambda_{\rho\_min}$) and the maximum value ($\lambda_{\rho\_max}$) may be set within the range of 0 and 1. Further, the events per revenue forgetting factor ($\lambda_\rho$) is restricted (e.g., in accordance with Eq. 6) from being adjusted to less than the minimum value ($\lambda_{\rho\_min}$) or greater than the maximum value ($\Delta_{\rho\_max}$).

Next, at block 620, where the events per revenue forgetting factor ($\lambda_\rho$) may be adjusted to reduce the volatility of the cost estimate (e.g., by estimation module 430 of FIG. 4). Estimation module 430 may set a volatility parameter (e.g., $\sigma_{ref}$) for the cost estimation, and update the events per revenue forgetting factor ($\lambda_\rho$) based at least in part on the volatility reference parameter ($\sigma_{ref}$) to control the volatility of the cost estimate, or keep the volatility of the cost estimate at a prescribed volatility level associated with $\sigma_{ref}$. As an example, in some embodiments, estimation module 430 may reduce $\sigma_{ref}$ to increase $\lambda_\rho$, thus reducing the volatility of the cost estimation. Further, as $\sigma_{ref}$ defines a certain level of volatility, an events per revenue forgetting factor ($\lambda_\rho$) determined based on a particular $\sigma_{ref}$ would also keep the cost estimate at a prescribed volatility level associated with this particular $\sigma_{ref}$. In other embodiments, $\sigma_{ref}$ can be a user defined parameter that enables a user to control the level of volatility of the cost estimate.

In some embodiments, the minimum value ($\lambda_{\rho\_min}$) and/or the maximum value ($\lambda_{\rho\_max}$) may be adjusted to potentially reduce the volatility of the cost estimate, e.g., reducing drastic change from the cost estimate for the current state from the prior cost estimate. As the values of the minimum value ($\lambda_{\rho\_min}$) or the maximum value ($\lambda_{\rho\_max}$) are increased, it would follow that the events per revenue forgetting factor ($\lambda_\rho$) may also be increased in some instances. Thus, the cost estimation may be less susceptible to recent observation of event rates or revenue.

Next, at block 630, where the events per revenue forgetting factor ($\lambda_\rho$) may be adjusted to increase the responsiveness of the cost estimation, e.g., by estimation module 430 of FIG. 4 or a user. On the contrary to block 620, estimation module 430 may increase $\sigma_{ref}$ to make $\lambda_\rho$ smaller, thus increasing the responsiveness of the cost estimation, especially for cases when the observed event rate is low. In such an embodiment, the minimum value ($\lambda_{\rho\_min}$) and/or the maximum value ($\lambda_{\rho\_max}$) may be decreased to potentially increase the responsiveness of the cost estimate for some cases. As mentioned previously, in a particular embodiment, $\sigma_{ref}$, $\lambda_{\rho\_min}$, and $\lambda_{\rho\_max}$ are user defined parameters that enable the user to control the level of volatility of the cost estimate.

Having described embodiments of the present invention, an example operating environment in which embodiments of the present invention may be implemented is described below in order to provide a general context for various aspects of the present invention. Referring to FIG. 7, an illustrative operating environment, or computing platform, for implementing embodiments of the present invention is shown and designated generally as computing device 700. Computing device 700 is but one example of a suitable computing environment and is not intended to suggest any limitation as to the scope of use or functionality of the invention. Neither should the computing device 700 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialized computing devices, etc. The invention may also be practiced in distributed computing environments where tasks are performed by remote-processing devices that are linked through a communications network.

With reference to FIG. 7, computing device 700 includes a bus 710 that directly or indirectly couples the following devices: memory 720, one or more processors 730, one or more presentation components 740, input/output (I/O) ports 750, I/O components 760, and an illustrative power supply 770. Bus 710 represents what may be one or more busses (such as an address bus, data bus, or combination thereof). Although depicted in FIG. 7, for the sake of clarity, as delineated boxes that depict groups of devices without overlap between these groups of devices, in reality this delineation is not so clear cut and a device may well fall within multiple ones of these depicted boxes. For example, one may consider a display to be one of the one or more presentation components 740 while also being one of the I/O components 760. As another example, processors have memory integrated therewith in the form of cache; however, there is no overlap between the one or more processors 730 and the memory 720. A person having ordinary skill in the art will readily recognize that such is the nature of the art, and it is reiterated that the diagram of FIG. 7 merely depicts an illustrative computing device that can be used in connection with one or more embodiments of the present invention. It should also be noticed that distinction is not made between such categories as "workstation," "server," "laptop," "hand-held device," etc., as all such devices are contemplated to be within the scope of computing device 700 of FIG. 7 and any other reference to "computing device," unless the context clearly indicates otherwise.

Computing device 700 typically includes a variety of computer-readable media. Computer-readable media can be any available media that can be accessed by computing device 700 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 700. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 720 includes computer-storage media in the form of volatile and/or nonvolatile memory. The memory may be removable, non-removable, or a combination thereof. Typical hardware devices may include, for example, solid-state memory, hard drives, optical-disc drives, etc. Computing device 700 includes one or more processors 730 that read data from various entities such as memory 720 or I/O components 760. Presentation component(s) 740 present data indications to a user or other device. Illustrative presentation components include a display device, speaker, printing component, vibrating component, etc.

In various embodiments, memory 720 includes, in particular, temporal and persistent copies of cost estimation logic 722. Cost estimation logic 722 includes instructions that, when executed by one or more processors 730, result in computing device 700 to adaptively estimate an average cost per event, such as, but not limited to, process 500 or process 600. In various embodiments, cost estimation logic 722 includes instructions that, when executed by processor 730, result in computing device 700 performing various functions associated with, but not limited to, observation module 410, tracking module 420, or estimation module 430 in connection with FIG. 4.

In some embodiments, one or more processors 730 may be packaged together with cost estimation logic 722. In some embodiments, one or more processors 730 may be packaged together with cost estimation logic 722 to form a System in Package (SiP). In some embodiments, one or more processors 730 can be integrated on the same die with cost estimation logic 722. In some embodiments, processor 730 can be integrated on the same die with cost estimation logic 722 to form a System on Chip (SoC).

In the preceding detailed description, reference is made to the accompanying drawings which form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the preceding detailed description is not to be taken in a limiting sense, and the scope of embodiments is defined by the appended claims and their equivalents.

Various aspects of the illustrative embodiments have been described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features have been omitted or simplified in order not to obscure the illustrative embodiments.

Various operations have been described as multiple discrete operations, in turn, in a manner that is most helpful in understanding the illustrative embodiments; however, the order of description should not be construed as to imply that these operations are necessarily order dependent. In particular, these operations need not be performed in the order of presentation. Further, descriptions of operations as separate operations should not be construed as requiring that the operations be necessarily performed independently and/or by separate entities. Descriptions of entities and/or modules as separate modules should likewise not be construed as requiring that the modules be separate and/or perform separate operations. In various embodiments, illustrated and/or described operations, entities, data, and/or modules may be merged, broken into further sub-parts, and/or omitted.

The phrase "in one embodiment" or "in an embodiment" is used repeatedly. The phrase generally does not refer to the same embodiment; however, it may. The terms "comprising," "having," and "including" are synonymous, unless the context dictates otherwise. The phrase "A/B" means "A or B." The phrase "A and/or B" means "(A), (B), or (A and B)." The phrase "at least one of A, B and C" means "(A), (B), (C), (A and B), (A and C), (B and C) or (A, B and C)."

What is claimed is:

1. A computer-implemented method, comprising:
    calculating, by a server, a revenue rate estimation for a present logical interval of an online marketing campaign based at least in part on observed revenue in a current logical interval of the online marketing campaign;
    calculating, by the server, a prior events per revenue estimate for the present logical interval based at least in part on values of a plurality of events per revenue state variables associated with a previous logical interval;
    determining, by the server, a volatility reference parameter associated with maintaining a volatility of a cost estimation at a defined volatility;
    generating, by the server, a tentative forgetting factor for the present logical interval based at least in part on a combination of the volatility reference parameter, the revenue rate estimation for the present logical interval, and the prior events per revenue estimate for the present logical interval,
    wherein the tentative forgetting factor is calculated based at least in part on:

$$\sigma_{ref}\hat{v}(k)\hat{\rho}_{old}(k)$$

where $\sigma_{ref}$ represents the volatility reference parameter, $\hat{v}(k)$ represents the revenue rate estimation at state k, and $\hat{\rho}_{old}(k)$ represents the prior events per revenue estimate at state k;

generating, by the server, a forgetting factor for discounting a contribution of the values of the plurality of events per revenue state variables associated with the previous logical interval, based at least in part on (i) the tentative forgetting factor for the present logical interval, (ii) a minimum forgetting factor value and (iii) a maximum forgetting factor value, wherein the forgetting factor is maintained between the minimum forgetting factor value and the maximum forgetting factor value;

updating, by the server, one or more values of the plurality of events per revenue state variables associated with the present logical interval utilizing an event volume observed in the current logical interval, the observed revenue in the current logical interval, and the forgetting factor, wherein the updating comprises utilizing the forgetting factor to discount an importance of one or more revenue state variables associated with the previous logical interval in updating a first value of the plurality of events per revenue state variables and utilizing the forgetting factor to discount an importance of one or more revenue state variables associated with the previous logical interval in updating a second value of the plurality of events per revenue state variables;

determining, by the server and based at least in part on the plurality of events per revenue state variables, a cost estimate, for the present logical interval, with a controlled volatility, wherein the forgetting factor is associated with maintaining the controlled volatility of the cost estimate at a threshold level and balancing a robustness and response time of the cost estimate; and controlling, by the server, the online marketing campaign operating in an online marketing network based at least in part on the cost estimate, wherein the server is configured to serve one or more advertisements based at least in part on control signals generated by the controlling, wherein the server is configured to control one or more bids placed in a market to facilitate obtaining a pacing within a cost limit set by a marketer.

2. The method of claim 1, comprising:
receiving input setting a minimum value for the forgetting factor;
detecting that the forgetting factor is less than the minimum value; and
in response to the forgetting factor being less than the minimum value, setting the forgetting factor equal to the minimum value.

3. The method of claim 1, comprising:
receiving input setting a maximum value for the forgetting factor;
detecting that the forgetting factor is greater than the maximum value; and
in response to the forgetting factor being greater than the maximum value, setting the forgetting factor equal to the maximum value.

4. The method of claim 1, comprising:
receiving an input value for a volatility parameter that is to maintain the relative volatility of the cost estimate equal to a prescribed level.

5. The method of claim 1, wherein updating the one or more values of the plurality of events per revenue state variables associated with the present logical interval comprises recursively updating a first state variable of the plurality of events per revenue state variables based at least in part on the event volume in the current logical interval and the forgetting factor.

6. The method of claim 1, wherein the tentative forgetting factor is calculated using the equation:

$$\lambda'_\rho(k) = 1 - 2\sigma_{ref}^2 \hat{v}(k) \hat{\rho}_{old}(k)$$

where $\lambda'_\rho(k)$ refers to the tentative forgetting factor at state k; $\sigma_{ref}$ represents the volatility reference parameter; $\hat{v}(k)$ represents the revenue rate estimation at state k; and $\hat{\rho}_{old}(k)$ represents the prior events per revenue estimate at state k.

7. The method of claim 1, comprising adjusting the forgetting factor, wherein the adjusting affects a volatility of a first revenue state variable from a first state to a second state.

8. The method of claim 1, wherein the minimum forgetting factor value and the maximum forgetting factor value are determined based at least in part on one or more user inputs.

9. One or more non-transitory computer-readable storage media having instructions stored thereon, which, when executed by one or more processors cause the one or more processors to:
calculate a revenue rate estimation for a present logical interval of an online marketing campaign based at least in part on observed revenue in a current logical interval of the online marketing campaign;
calculate a prior events per revenue estimate for the present logical interval based at least in part on values of a plurality of events per revenue state variables associated with a previous logical interval;
determining a volatility reference parameter associated with maintaining a volatility of a cost estimation at a defined volatility;
generating a tentative forgetting factor for the present logical interval based at least in part on a combination of the volatility reference parameter, the revenue rate estimation for the present logical interval, and the prior events per revenue estimate for the present logical interval,
wherein the tentative forgetting factor is calculated based at least in part on:

$$\sigma_{ref} \hat{v}(k) \hat{\rho}_{old}(k)$$

where $\sigma_{ref}$ represents the volatility reference parameter, $\hat{v}(k)$ represents the revenue rate estimation at state k, and $\hat{\rho}_{old}(k)$ represents the prior events per revenue estimate at state k;
generate a forgetting factor for discounting a contribution of the values of the plurality of events per revenue state variables associated with the previous logical interval, based at least in part on (i) the tentative forgetting factor for the present logical interval, (ii) a minimum forgetting factor value and (iii) a maximum forgetting factor value, wherein the forgetting factor is maintained between the minimum forgetting factor value and the maximum forgetting factor value;
update one or more values of the plurality of events per revenue state variables associated with the present logical interval utilizing an event volume observed in the current logical interval, the observed revenue in the current logical interval, and the forgetting factor;
determine, based at least in part on the plurality of events per revenue state variables, a cost estimate, for the present logical interval, with a controlled volatility, wherein the forgetting factor is associated with maintaining the controlled volatility of the cost estimate at a threshold level and balancing a robustness and response time of the cost estimate; and generate a price control signal based at least in part on the cost estimate for the present logical interval, the price control signal to be utilized to adjust a bid price for the online marketing campaign, wherein a server is configured to serve one or more advertisements based at least in part on control signals generated based at least in part on the price control signal, wherein the server is configured to control one or more bids placed in a market to facilitate obtaining a pacing within a cost limit set by a marketer.

10. The one or more computer-readable storage media of claim 9, wherein the instructions cause the one or more processors to:
receive input setting a minimum value for the forgetting factor;
detect that the forgetting factor is less than the minimum value; and
in response to the forgetting factor being less than the minimum value, set the forgetting factor equal to the minimum value.

11. The one or more computer-readable storage media of claim 9, wherein the instructions cause the one or more processors to:
receive input setting a maximum value for the forgetting factor;
detect that the forgetting factor is greater than the maximum value; and
in response to the forgetting factor being greater than the maximum value, set the forgetting factor equal to the maximum value.

12. The one or more computer-readable storage media of claim 9, wherein the instructions cause the one or more processors to:
receive an input value for a volatility parameter that is to maintain the relative volatility of the cost estimate equal to a prescribed level.

13. The one or more computer-readable storage media of claim 9, wherein the instructions which cause the one or more processors to update the values of the plurality of events per revenue state variables associated with the present logical interval cause the one or more processors to:
recursively update a first state variable of the plurality of events per revenue state variables based at least in part on the event volume in the current logical interval and the forgetting factor.

14. The one or more computer-readable storage media of claim 13, wherein the instructions which cause the one or more processors to update the values of the plurality of events per revenue state variables associated with the present logical interval cause the one or more processors to:
recursively update a second state variable of the plurality of events per revenue state variables based at least in part on the observed revenue in the current logical interval and the forgetting factor.

15. The one or more computer-readable storage media of claim 9, wherein the tentative forgetting factor is calculated using the equation:

$$\lambda'_\rho(k) = 1 - 2\sigma_{ref}^2 \hat{v}(k) \hat{\rho}_{old}(k)$$

where $\lambda'_\rho(k)$ refers to the tentative forgetting factor at state k; $\sigma_{ref}$ represents the volatility reference parameter; $\hat{v}(k)$ represents the revenue rate estimation at state k; and $\hat{\rho}_{old}(k)$ represents the prior events per revenue estimate at state k.

16. The one or more computer-readable storage media of claim 9, wherein the updating comprises utilizing the forgetting factor to discount an importance of one or more revenue state variables associated with the previous logical interval in updating a first value of the plurality of events per revenue state variables and utilizing the forgetting factor to discount an importance of one or more revenue state variables associated with the previous logical interval in updating a second value of the plurality of events per revenue state variables.

17. A system, comprising:
one or more processors; and
memory, coupled with the one or more processors, having instructions stored thereon, which, when executed by the one or more processors cause the one or more processors to:
determine a volatility reference parameter associated with maintaining a volatility of a cost estimation at a defined volatility;
generate a tentative forgetting factor for a present logical interval based at least in part on a combination of the volatility reference parameter, a revenue rate estimation for the present logical interval, and a prior events per revenue estimate for the present logical interval,
wherein the tentative forgetting factor is calculated based at least in part on:

$$\sigma_{ref} \hat{v}(k) \hat{\rho}_{old}(k)$$

where $\sigma_{ref}$ represents the volatility reference parameter, $\hat{v}(k)$ represents the revenue rate estimation, and $\hat{\rho}_{old}(k)$ represents the prior events per revenue estimate;
generate a forgetting factor for discounting a contribution of values of a plurality of events per revenue state variables based at least in part on (i) the tentative forgetting factor for the present logical interval, (ii) a minimum forgetting factor value and (iii) a maximum forgetting factor value, wherein the forgetting factor is maintained between the minimum forgetting factor value and the maximum forgetting factor value;
determine a cost estimate for an online marketing campaign based at least in part on an observed event volume, and observed revenue, and the forgetting factor, wherein the forgetting factor is adaptively updated to keep a volatility of the cost estimate under a threshold level and balancing a robustness and response time of the cost estimate;
generate a price control signal based at least in part on the cost estimate; and
control the online marketing campaign operating in an online marketing network based at least in part on the price control signal, wherein a server is configured to serve one or more advertisements based at least in part on control signals generated by the controlling, wherein the server is configured to control one or more bids placed in a market to facilitate obtaining a pacing within a cost limit set by a marketer.

18. The system of claim 17, wherein the instructions provide the system with a cost actuator to receive the price control signal and a plurality of segment performance estimates associated with a plurality of segments of the online marketing campaign, and to determine a bid price for each segment of the plurality of segments based at least in part on the price control signal and the plurality of segment performance estimates.

19. The system of claim 17, wherein the instructions provide the system with a cost estimator is to update the forgetting factor based at least in part on one or more volatility reference parameters to keep the volatility of the cost estimate at a prescribed volatility level.

20. The system of claim 17, wherein the tentative forgetting factor is calculated using the equation:

$$\lambda'_\rho(k) = 1 - 2\sigma_{ref}^2 \hat{v}(k)\hat{\rho}_{old}(k)$$

where $\lambda'_\rho(k)$ refers to the tentative forgetting factor at state k; $\sigma_{ref}$ represents the volatility reference parameter: $\hat{v}(k)$ represents the revenue rate estimation; and $\hat{\rho}_{old}(k)$ represents the prior events per revenue estimate.

* * * * *